Aug. 12, 1958 C. D. SOUTHARD 2,847,573

THYRATRON CIRCUIT

Filed Aug. 17, 1956 2 Sheets-Sheet 1

INVENTOR.
CARL D. SOUTHARD

BY Paul M. Brannen

AGENT.

Aug. 12, 1958

C. D. SOUTHARD

THYRATRON CIRCUIT 2,847,573

Filed Aug. 17, 1956

2 Sheets-Sheet 2

United States Patent Office 2,847,573

Patented Aug. 12, 1958

2,847,573

THYRATRON CIRCUIT

Carl D. Southard, Endicott, N. Y., assignor to International Business Machines Corporation, New York, N. Y., a corporation of New York Application August 17, 1956, Serial No. 604,766

3 Claims. (Cl. 250—36)

Figure 1:
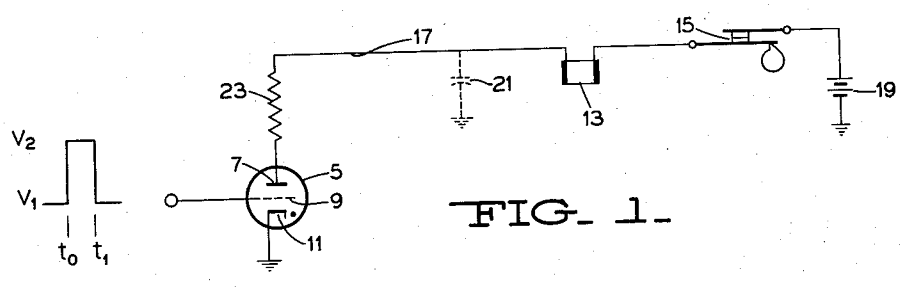

This invention relates to thyratron circuits, and more particularly, to an improved form of thyratron circuit capable of reliable operation in the presence of relatively large values of stray capacitance.

Grid controlled hot cathode gas tubes, of the thyratron type, are widely used in applications requiring relatively large power handling capacity, and also in those instances where it is desired to initiate circuit operation by a control pulse supplied to a control electrode or grid of the thyratron, whereafter conduction is maintained until the anode voltage is sufficiently reduced to extinguish the tube, as by opening the anode circuit.

As an example of such an application, a thyratron may be employed to govern an electromagnetic load device such as a relay or solenoid, in a circuit supplied with direct current through some type of switch, so that application of a suitable control signal to a grid of the thyratron causes it to fire, and energize the load device. The thyratron thereafter remains fired, and the load device remains energized, until the switch is opened to interrupt the supply of direct current to the circuit.

However, a number of factors enter into the proper operation of such a circuit, particularly where the circuit is to be controlled by pulses of a time duration comparable to the ionization time of the thyratron, which is generally of the order of 0.5 microsecond. The presence of stray capacitance which shunts the anode and cathode of the thyratron is particularly bothersome, since it is not possible to entirely eliminate the stray capacitance, and the smallest values which are obtainable by careful layout of wiring, etc., are still such that the time constant of the associated circuit is relatively large compared to the ionization and deionization times of the thyratron. Where other design standards fix the operating voltages, signal pulse lengths, load impedance and the like, it is difficult to reliably fire the thyratron and maintain it conducting properly when such stray capacitance is present.

Accordingly, an object of the present invention is to provide an improved thyratron circuit which effectively isolates stray capacitance in the circuit from the thyratron to permit more reliable operation.

Another object of the invention is to provide an improved thyratron circuit which utilizes a suitable decoupling resistor to isolate the stray capacitance from the thyratron.

A further object of the invention is to provide a suitable decoupling resistor connected between the anode of a thyratron and a load circuit having stray capacitance to prevent the anode voltage of the thyratron from falling below the required anode firing potential.

Still another object of the invention is to provide a suitable decoupling resistor connected between the anode of a thyratron and a load circuit having stray capacitance, the value of the resistor being chosen so that the relaxation oscillations which take place when the thyratron is fired are enabled to continue after the control signal has been removed from the thyratron grid.

A further object of the invention is to provide an improved thyratron circuit.

Other objects of the invention will be pointed out in the following description and claims and illustrated in the accompanying drawings, which disclose, by way of examples, the principle of the invention and the best mode, which has been contemplated, of applying that principle.

Figure 2:
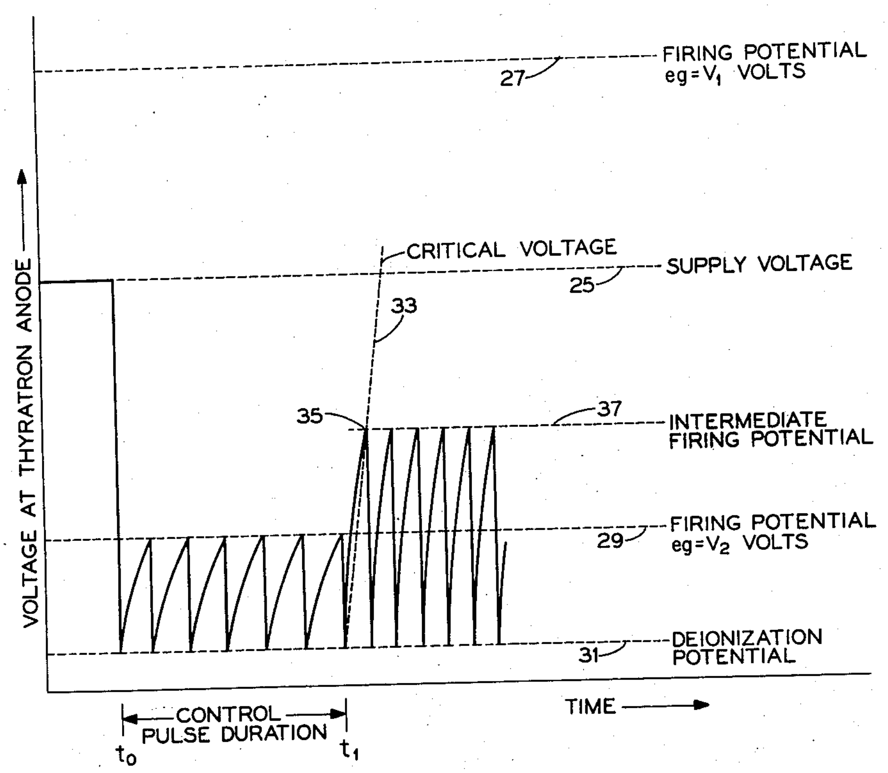
Figure 3:
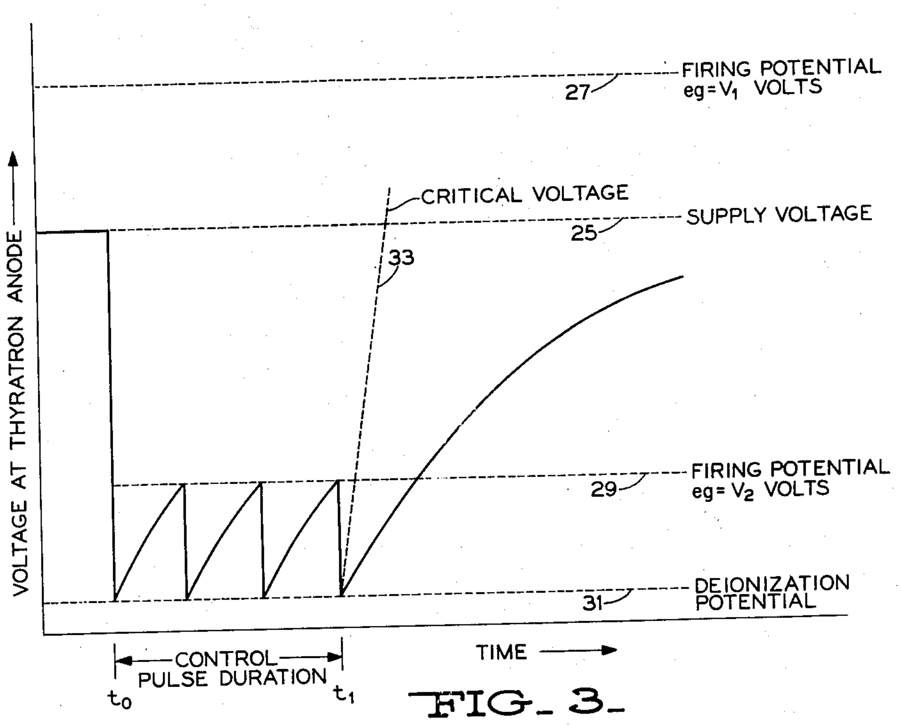
Figure 4:
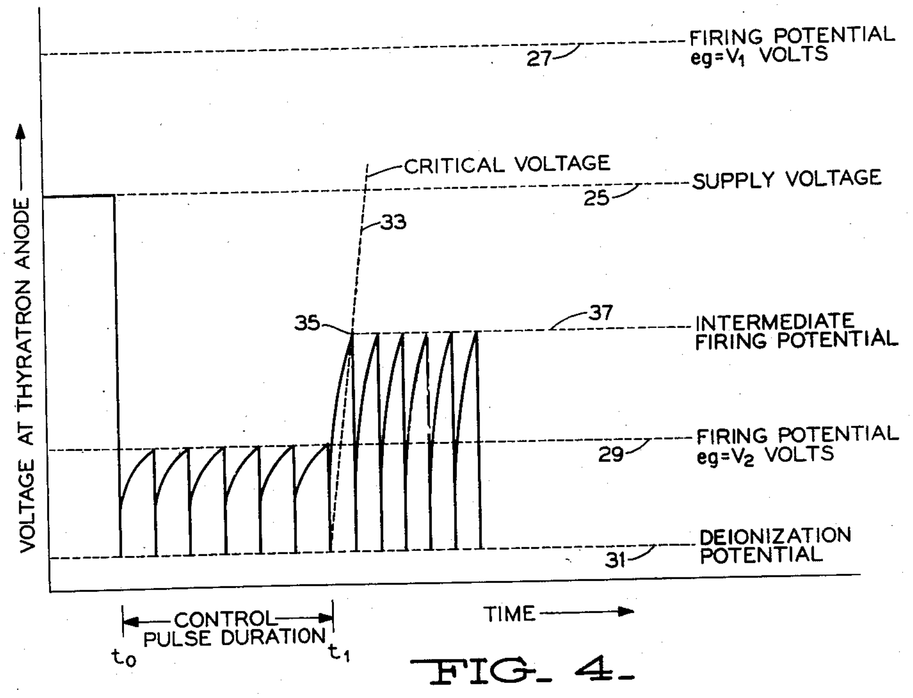

In the drawings:

Fig. 1 is a diagrammatic illustration of a thyratron circuit showing a preferred embodiment of the invention, and Figs. 2, 3 and 4 are waveform illustrations which depict the operation of the circuit under various operating conditions.

Similar reference characters refer to similar parts in each of the several views.

Briefly described, the subject invention provides an improved thyratron circuit in which a decoupling resistor is connected between the anode of the thyratron and the load circuit, with the resistor connected as close as physically possible to the anode of the tube, preferably to the anode pin connection of the tube mounting socket. The resistor has a value chosen so that the relaxation oscillations which occur when the thyratron is fired by a suitable control pulse are continued after the control pulse terminates. That is, the value of resistance is determined by the rate at which the firing potential of the tube changes during the time that the tube is deionized during each cycle of oscillation. If the resistance is suitably chosen the voltage across the tube will rise faster than the firing potential, and the oscillations will be maintained. On the other hand, if too little resistance is provided, the firing potential will increase at a rate faster than the anode voltage and the tube will be extinguished and remain so. Furthermore, the resistance must not be so high as to excessively limit the operating current required by the connected load.

The manner in which such a decoupling resistor is employed to produce the desired results is illustrated in Fig. 1. As shown, a thyratron 5, provided with an anode 7, at least one control grid 9, and cathode 11, has the anode and cathode thereof connected in series in a work circuit including a load device 13, a circuit breaker 15 and a transmission line 17. Direct current energy at a suitable voltage is supplied from a suitable source, such as the battery 19, for example, with the positive terminal connected to the circuit breaker 15 and the negative terminal grounded, as is cathode 11. The transmission line 17 has a stray capacity to ground, as indicated symbolically by the dotted representation of a capacitor 21. The heater for the thyratron and the source of heater energy are not shown, in order to clarify the drawing.

Decoupling resistor 23 is connected in series in the work circuit and is located as close to the anode connection of thyratron 5 as is physically reasonable. The stray capacity of the transmission line is thereby effectively isolated from the thyratron so that its reliable operation is obtained as will be explained in detail hereinafter.

In considering the operation of this invention, it is believed that a better understanding of the improvement obtained by its use can be had by considering the operation of a circuit similar to that shown in Fig. 1, except with the decoupling resistor 23 removed from the circuit, so that the transmission line 17 is directly connected to the anode 7 of thyratron 5. Where the stray capacity associated with transmission line 17, and effectively shunted across the anode and cathode of the thyratron, is of relatively low value, the operation of the circuit without the decoupling resistor 23 is illustrated by the waveforms shown in Fig. 2.

As shown, the voltage across the stray capacitance, and hence across the anode and cathode of the thyratron is plotted against time. Initially, the voltage across capacitance 21 is at the steady state value indicated as the supply voltage and designated by reference character 25, assuming that circuit breaker 15 is closed at this time. A suitable negative bias is supplied to the thyratron by any suitable source, not shown, at some value of voltage designated as $V_1$. Under these conditions, the firing potential of the thyratron, i. e., the anode-cathode voltage required to cause conduction, is at some relatively high value, as indicated by line 27 on the graph, and since the supply voltage is lower than this value, the thyratron is nonconductive.

Let it now be assumed that a positive going pulse having an excursion of $V_2-V_1$ volts is applied to grid 9 at time $t_0$ for a duration $t_2-t_1$ microseconds. The firing potention is reduced to the value indicated by line 29 on the graph for $eg=V_2$ volts, which is below the value of the supply voltage, and hence the thyratron fires, as indicated by the abrupt drop in the voltage curve at $t_0$. The voltage falls to a value equal to the deionization or extinguishing voltage of the thryratron, designated by line 31 on the graph at which voltage the tube stops conducting, and the voltage starts increasing exponentially in accordance with the characteristic of a resistance-capacitance circuit, as a result of the stray capacitance 21 being recharged from the supply 19 through the resistance of load device 13 and line 17. When the voltage reaches the value 29, the tube will again fire, and this operation will be repeated for the duration of the control pulse. Thus it can be seen that during the period from $t_0$ to $t_1$, a series of relaxation oscillations take place, with the thyratron, the load and line resistance and the stray capacitance forming a relaxation oscillator. The current flowing through the load device 13 at this time causes the desired operation thereof.

At time $t_1$, the control pulse terminates, and the control grid 9 is returned to its negatively biased voltage $V_1$. Accordingly, the required firing potential starts rising from the value 29 to the value 27. This transition is not instantaneous, but since the exact curve of this increase is not known, it is herein indicated as a straight line curve 33 designated as critical voltage. The curve may actually take any form, as will be subsequently shown, so that its exact representation is not material to the invention.

The essential necessity, if thyratron 5 is to remain fired after the control pulse terminates, is that the rise time of the voltage at the anode of the thyratron be such that the critical voltage curve is intersected by the rising voltage curve at the anode, at some value equal to or less than the value of the supply voltage.

In the example shown in Fig. 2, it can be seen that the rising voltage at the anode of the thyratron intersects the critical voltage curve, at a point 35 on line 37, designated as the intermediate firing potential. It is apparent, therefore, that the thyratron will fire and the relaxation oscillations will continue, even though the control pulse has terminated, so that energy will be supplied to load device 13 until the circuit breaker 15 opens, cutting off the supply of energy to the circuit.

From the foregoing, it will be seen that the circuit shown in Fig. 1, with decoupling resistor 23 eliminated, will operate satisfactorily as long as the circuit constants are such that the relaxation oscillations initiated by the control pulse can continue after termination of the pulse. The specific requirement for continued oscillation is that the voltage at the anode of the tube must increase at a rate such that it intersects the rising critical potential curve after each deionization of the tube.

The effect of a relatively large value of stray capacitance upon the circuit of Fig. 1, in the absence of resistor 23, is illustrated in Fig. 3. With other constants remaining unchanged, a large amount of stray capacitance will cause the rise time of the voltage at the anode of the thyratron to be considerably increased, so that, at the end of the control pulse, the anode voltage increases at a slower rate than the critical voltage. Thus the critical voltage curve is never intersected by the anode voltage curve. At the termination of the control pulse therefore, the thyratron will extinguish, and the voltage at the anode will rise exponentially to the supply voltage, without further conduction.

Thus the stray capacitance seriously affects the ability of the thyratron to fire and remain fired following the application of a control pulse.

A number of well-known expedients may be employed to decrease or eliminate the possibility of the tube extinguishing after the termination of the pulse. The first would obviously be the elimination or substantial reduction of the stray capacitance. However, the stray capacitance can never be entirely eliminated, and physical limitations, such as the requirement for locating the thyratrons and the load devices at their most expeditious locations, which may be some relatively large distance apart, prevents the stray capacitance from being reduced as much as it might be were its reduction the sole consideration. Other expedients include increasing the value of the supply voltage, decreasing the resistance of the load device and the line, etc., but where these parameters are fixed by other considerations, such expedients are to no avail.

However, the present invention enables the operation of the circuit in a reliable and satisfactory manner, without resorting to the changes described above, by providing suitable decoupling between the anode of the thyratron and the remainder of the circuit in the form of a decoupling resistor 23. In effect, this decoupling resistor isolates the thyratron from the stray capacitance to a degree which permits the thyratron to oscillate in a manner similar to that occurring for a very low value of capacitance, as illustrated in Fig. 1 and described hereinbefore.

The operation of the circuit of Fig. 1, including the resistor 23, is illustrated by the waveforms of Fig. 4. When the thyratron is initially fired by the control pulse, the voltage across the anode drops to the deionization potential, whereupon the tube extinguishes. When current flow stops, the potential at the anode immediately rises to the voltage value which exists across the stray capacitance at that time, since the voltage drop across the resistor caused by the thyratron current disappears. The voltage at the anode then continues to rise in accordance with the charging of the stray capacitance, until the firing potential 29 is reached, whereupon the thyratron again conducts, and the voltage at the anode is abruptly reduced to the deionization potential. These relaxation oscillations continue as shown in Fig. 4, for the duration of the control pulse.

When the control pulse terminates, the critical voltage starts to rise, and, if resistor 23 were not present, the anode voltage would not rise quickly enough to intersect the critical voltage, so that the tube would extinguish and remain extinguished, as described in connection with Fig. 3. However, the anode voltage immediately rises to some intermediate value, and thereafter continues to rise exponentially with the charging of the capacitance. The abrupt initial increase insures that the rising anode voltage will intersect the critical voltage at a point 35 so that the thyratron continues its oscillations, and energy continues to be supplied to load device 13 until circuit breaker 15 opens.

The ohmic value of resistor 23 will of course vary in accordance with a number of factors, such as the thyratron characteristics, load and line resistance, supply voltage, etc., but, as limits to the value which may be employed, the resistance should be sufficiently high to permit rapid enough recovery of the anode voltage, and not be so high that the value of current in the circuit is inadequate for operation of the load device. Such a value is readily obtainable by the substitution of a variable resistance in the circuit, followed by the use of a suitable value of fixed resistance.

It is apparent from the foregoing that the present invention provides an inexpensive and efficient solution to the problem of maintaining a thyratron in a conductive condition where a relatively large stray capacitance is associated with the anode-cathode circuit of the thyratron.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination, a source of electrical energy, a load device, a thyratron having an anode, a cathode and at least one control electrode, a work circuit including stray capacitance connected to said source of energy and to said anode and cathode, said work circuit requiring a predetermined minimum current, means for supplying control pulses to said control electrode to initiate relaxation oscillations in said thyratron, and means for isolating said anode and cathode from the work circuit comprising a decoupling resistor connected between said work circuit and said anode, said resistor having a value sufficiently high to permit said relaxation oscillations to continue after the termination of the control pulse, and sufficiently low to permit at least said minimum current to flow in said work circuit.

2. In combination, a source of direct current energy, a load device requiring a predetermined minimum current, a thyratron having an anode, a cathode and at least one control electrode, a control switch, a transmission line for connecting the anode and cathode of said thyratron to said source and having in series therewith said load device and said control switch, said transmission line having stray capacitance which is effectively connected across said anode and cathode, means for supplying control pulses to said control electrode to initiate relaxation oscillations of the thyratron when said control switch is closed, and means for maintaining the thyratron in oscillation after the control pulse is terminated and until said control switch is opened, comprising a decoupling resistor connected between said anode of the thyratron and said transmission line and having a value sufficient to maintain said relaxation oscillations but insufficient to reduce the current of said load device below said predetermined minimum current.

3. In combination, a source of direct current energy having a predetermined supply voltage value, a load device requiring a predetermined minimum value of operating current, a thyratron having an anode, a cathode, and at least one control electrode, said thyratron having a critical voltage curve representing the change in voltage with respect to time, from the deionization potential to a firing potential exceeding said supply voltage value, a control switch, a transmission line for connecting the anode and cathode of said thyratron to said source and having in series therewith said load device and said control switch, said transmission line having stray capacitance which is effectively connected across said anode and cathode, means for supplying control pulses to said control electrode to initiate relaxation oscillations of the thyratron when said control switch is closed, and means for maintaining the thyratron in oscillation after the control pulse is terminated and until said control switch is opened, comprising a decoupling resistor connected between said anode of the thyratron and said transmission line, said resistor having a value selected sufficiently low to permit at least said minimum operating current to flow through said load device, and having a value sufficiently high to permit the anode voltage at said anode to rise sufficiently fast to exceed the critical voltage of said thyratron during each firing of the thyratron.

References Cited in the file of this patent

UNITED STATES PATENTS

| | | |
|---|---|---|
| 2,288,554 | Smith | June 30, 1942 |
| 2,329,137 | Richards | Sept. 7, 1943 |
| 2,753,453 | Michels | July 3, 1956 |